SIGNAL RECEIVING &
METERING ASSEMBLY

INVENTORS
HENRY TAYLOR HOWARD
CLARENCE L. AUERNHEIMER

Sept. 17, 1968 H. T. HOWARD ET AL 3,402,391
CONTINUOUS CONTROL USING ALTERNATING OR DIRECT CURRENT
VIA A SINGLE CONDUCTOR OF PLURAL FUNCTIONS
AT A REMOTE STATION
Filed April 19, 1965 4 Sheets-Sheet 4
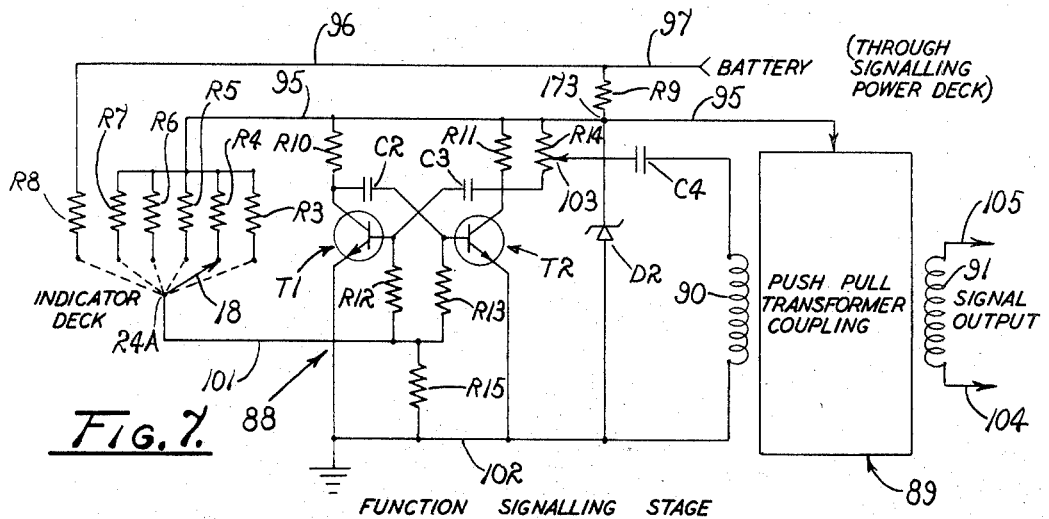
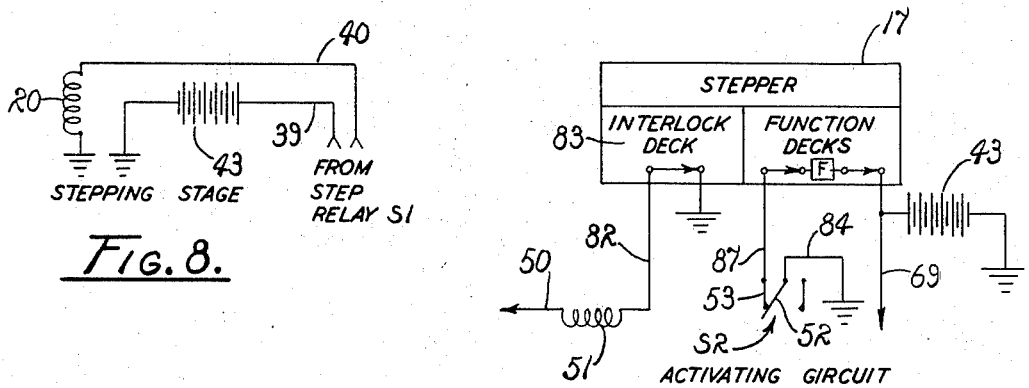
INVENTORS
HENRY TAYLOR HOWARD
CLARENCE L. AUERNHEIMER
ATTORNEYS United States Patent Office 3,402,391
Patented Sept. 17, 1968

3,402,391
CONTINUOUS CONTROL USING ALTERNATING OR DIRECT CURRENT VIA A SINGLE CONDUCTOR OF PLURAL FUNCTIONS AT A REMOTE STATION
Henry Taylor Howard, Menlo Park, and Clarence L. Auernheimer, Fresno, Calif., assignors to A. V. Electronics, Inc., a corporation of California
Filed Apr. 19, 1965, Ser. No. 449,013
12 Claims. (Cl. 340—163)

ABSTRACT OF THE DISCLOSURE

A system for controlling and monitoring the operation of members performing functions in an oil well borehole is disclosed. This system consists essentially of a compact arrangement of the members, a power source, switches, relays and changeover circuitry at the remote station in the borehole. The remote station is connected by a single conductor to a control station which has a source of alternating current and rectifier means, switches and circuitry. The switches are selectively operable for supply of direct or alternating current through the single conductor for selection and operation of a member, respectively. The conductor also serves for return of the function member condition indicating signals to the control station.

---

The present invention relates to a system for continuous control through a single conductor element of a plurality of functions disposed at a remote station and more particularly to a system which allows selective activation from a control station of the respective functions in predetermined continuous sequence and which gives indication at the control station of conditions at the remote station including indication of the function connected for immediate activation, both activation and indication being controlled in response to signals transmitted through a single control element leading from the control station to the remote station.

The invention is conveniently described in connection with the remote control and monitoring of various functioning units disposed in a borehole, including a pumping unit, a camera unit with flash attachment and other necessary and related elements. Examples of such units are described in Patents Nos. 2,633,783 and 2,677,996, issued Apr. 7, 1953, and May 11, 1954, respectively, to Claude Laval, Jr. The invention, however, is well suited for remote control of many other types of functioning units.

In various environments a need exists for activating in selected sequence the individual units of a plurality of functioning units disposed at a remote station. It has been known to accomplish the desired result by utilizing various electric circuits at the remote station and control station, the two stations being connected by a plurality of conductive elements, each conductive element serving as a control line for a respective remote functioning unit. However, this usually results in high installation expense due to the relatively extended distances between the control stations and remote stations. Use of multiple conductive elements increases the cost of material required, the size of the borehole or conductor housing necessary for accommodation of the several conductive elements and the equipment requirements for placing the system in operation. In addition, the maintenance problem is appreciable due to the natural wear and tear of the extensive cable elements.

In minimizing the above problems, a single conductive element offers significant advantages. It is difficult, however, to activate a remote function by control through a single element without causing disturbance to other remote functions connected to the same element. Since only one effective signal can be depended upon at any one moment to proceed through the single connective element, there has been a great need to provide a means of distinguishing between the functions to be activated by a single signal. Furthermore, there has been the problem of coordinating the control impulses with the return or monitor signals so that any monitoring of the remote functions could be accomplished without interference by the control impulses.

In many environments it is desired to utilize a control system which is relatively rugged and reliable even when submitted to rough usage. This is obviously true with work in boreholes, which often extend many hundreds or thousands of feet into the earth. In attempting to eliminate the previously mentioned difficulties inherent in the use of a single conductive element, the problem is thus increased by further requirements for simplicity, ruggedness and reliability.

There is no opportunity periodically to examine the remote units without retrieval of the apparatus and, therefore, it must be possible to monitor conditions at the remote station from the control station if they are to be monitored at all. Such monitoring should include signaling the condition of any remote power supply unit so as to allow reenergizing the unit if necessary. Such measures are necessary to insure the continued effective operation of the various functioning units; however, prior to this invention it has not been known how to satisfy this need through use of a single conductor.

Therefore, it is an object of the present invention to provide a system for continuous control through a single conductor element of a plurality of remote function members disposed at a remote station.

Another object is to provide such a system which allows the selective activation of the individual function members in continuous predetermined sequence.

Another object is to provide such a system which allows monitoring of the remote function members to determine which is connected for immediate activation.

Another object is to provide such a system which includes a source of energy at the remote station for activation of the function members.

Another object is to provide such a system which allows monitoring of the condition of a source of energy disposed at the remote station without disturbing the sequence of function member activation.

Another object is to provide such a system which includes a source of energy at the control station for energizing system elements as necessary to allow conserving the remote source of energy for energizing selected elements or function members.

Another object is to provide such a system which allows the selective reenergizing of a remote source of energy as necessary.

Another object is to provide such a system which allows the selective activation of individual function members without causing disturbance to the other function members.

Another object is to provide such a system which avoids disturbance to the function members during reenergization of the remote source of energy.

Another object is to provide such a system which is rugged and reliable and adapted to operate in all natural extremes of a subterranean environment or the like.

Another object is to provide such a system which allows activation of the respective function members by operation of a single control switch mechanism.

Another object is to provide such a system which allows operation of the control switch mechanism without influencing unrelated circuit elements.

Another object is to provide such a system which allows the preconditioning of selected remote function members without affecting the condition of other remote function members.

Another object is to provide such a system which provides indication at the control station of conditions at the remote station.

Another object is to provide such a system which is adapted to be used with a plurality of function members of any desired type.

These, together with other objects, will become more fully apparent upon reference to the specification and accompanying drawings.

In the drawings:

FIG. 7 is a schematic circuit diagram of the function signaling stage at the remote station.

FIG. 8 is a fragmentary schematic circuit diagram showing the stepping circuit at the remote station.

FIG. 9 is a fragmentary schematic circuit diagram showing the function activation circuit at the remote station.

Figure 1:
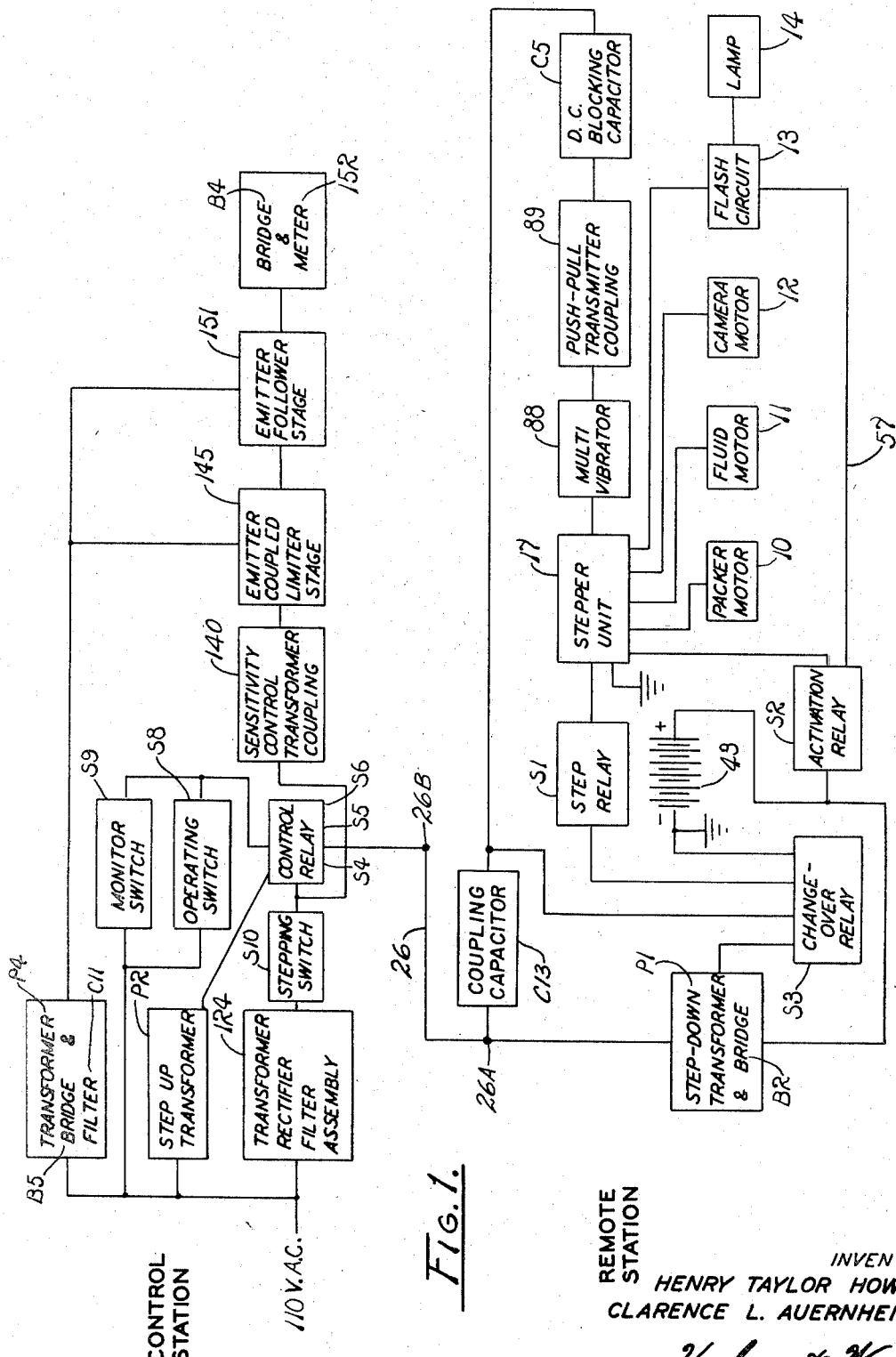
FIG. 1 is a schematic block diagram of the over-all control system of the present invention.

Referring more particularly to the drawings, the electrically operable function members to be controlled by means of the present invention are shown schematically in FIG. 1 in combination with the control circuit. They comprise a packer motor 10 and pump, a fluid motor 11 and pump, a camera motor 12 and a flash circuit 13 with lamp 14. These function members are merely representative and are taught individually by Claude Lavel, Jr.'s prior patents but are generally described herein in order to lay a foundation for the more detailed description of applicant's present invention. The packer motor is adapted to operate the pump for inflating an expansible packer or bladder, not shown, by pumping a quantity of borehole fluid into the packer. It is reversible in operation. A description of its function and structure is described in Patent No. 2,677,996, referred to above.

A second pump, not shown, is driven by the fluid motor 10 which is also reversible in operation. Its function is principally to displace a volume of downhole fluid from the section to be photographed and to substitute a clear fluid for the displaced fluid. Its operation and purpose is also described in the above patent.

The third function member consists of a motor 12 for advancing film in a camera, not shown, and energizing other mechanical elements of the camera as necessary. A description of the operation of the camera and motor is given in Claude Laval, Jr., Patent No. 2,633,783, issued Apr. 7, 1953, with Reissue No. 24,076; Patent No. 2,760,417, issued Aug. 28, 1956; and Patent No. 2,794,944, issued June 4, 1957.

The remaining function member in the present embodiment comprises a flash circuit 13 for a lamp 14. Such a circuit is energized by electric current and actuated by discontinuation of the current as described in the above patents related to the camera.

In their preferred usage the function members are housed within a cylindrical housing, not shown, adapted to be lowered into an elongated borehole or a well containing water, oil, or other liquid. The advantages in being able to obtain photographic records of boreholes or wells and the like are well known. In general, the function members in their housing are lowered to an extended depth below ground and permit the careful inspection and photographic recording of downhole conditions and the like.

*Stepper unit*

The function members are each connected to a suitable type of programmer or stepper unit 17. The structure and use of such a unit is well known and will be briefly described at this point. In general, the stepper unit comprises a plurality of switching elements, as exemplified at 18 in FIG. 3, which are gang-mounted on a rotatable common shaft 19 in concentric axially spaced relation. The switching elements rotate as a unit with the shaft in response to energization of a suitable electromagnetic device, such as a solenoid, a representative winding of which is shown at 20. The solenoid includes a typical ratcheted plunger, not shown, which serves to rotate the switching elements only one step at a time. A built-in interrupter, not shown, serves to adapt the solenoid for continuous stepping when it is desired to rotate the switching elements to an initial starting position, to be desired.

Each switching element 18 is disposed within an annular deck or wafer 21 having a series of terminals or contacts 24 around its inner periphery. One contact 24A on each deck is of a wiper type maintaining continuous sliding contact with the corresponding switching element. The switching elements are adapted respectively to provide conductive connection between a wiper contact and a selected peripheral contact. Other forms of steppers are suitable for use in this invention; however, the above described basic deck-and-switching-element devices are utilized in the illustrative system described herein.

Figure 2:
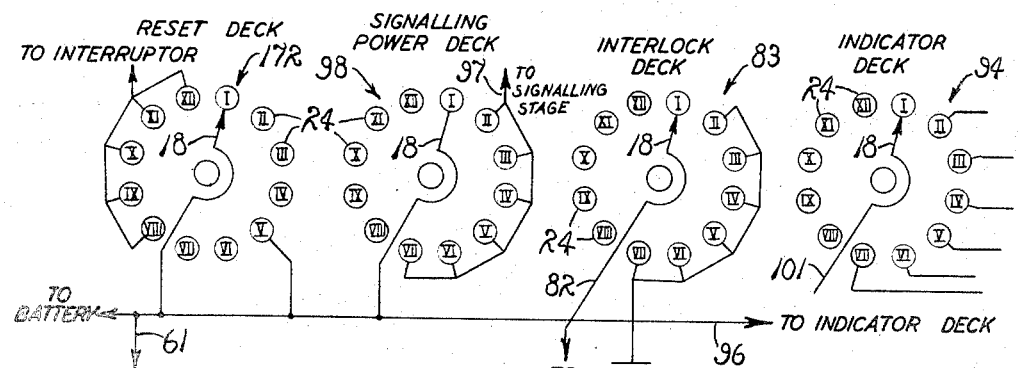
FIG. 2 is a fragmentary schematic diagram of a typical wiring arrangement for four decks of a stepper unit of the present invention.
Figure 3:
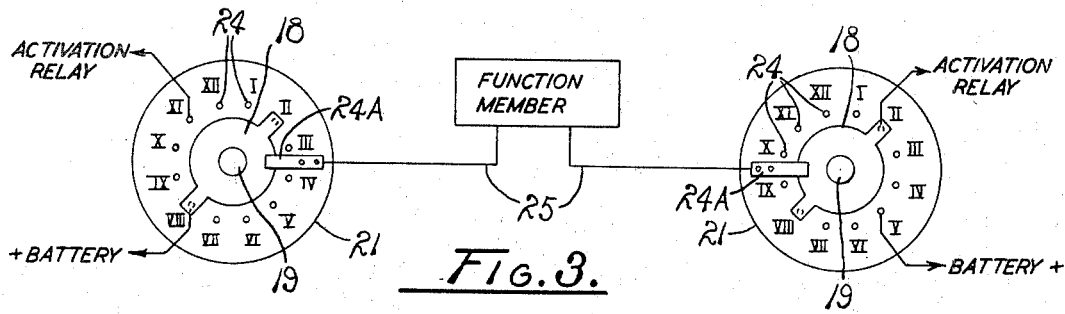
FIG. 3 is a simplified diagram of two representative decks and switching elements of the stepper unit.

The function members are connected by conductors 25 across a respective pair of wiper contacts 24A and between selected decks 21 so that by positioning the switching elements 18 at selected contacts the corresponding function member will be connected in series circuit for activation in accordance with the principles of the present invention. An example of such connection is shown in FIG. 3. In addition, the deck contacts are adapted to be connected in a typical manner for other uses related to effective operation of the present invention. FIG. 2 is a schematic representation of such other possible connections of the deck contacts for effective functioning of the present invention, as will be described below.

*Single conductor element*

Figure 4:
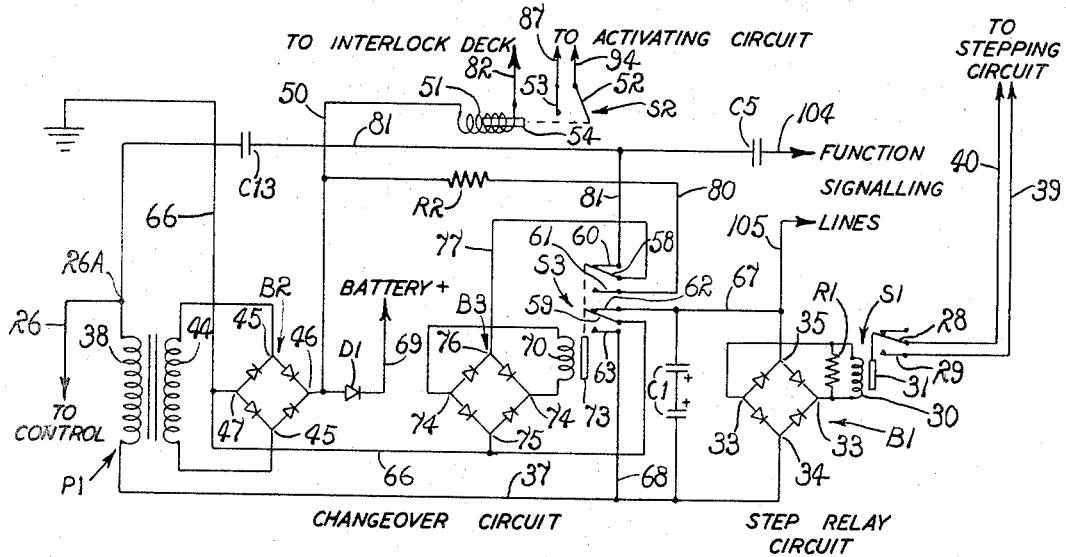
FIG. 4 is a schematic circuit diagram of a changeover and step-relay circuit at the remote station of the present invention.
Figure 5:
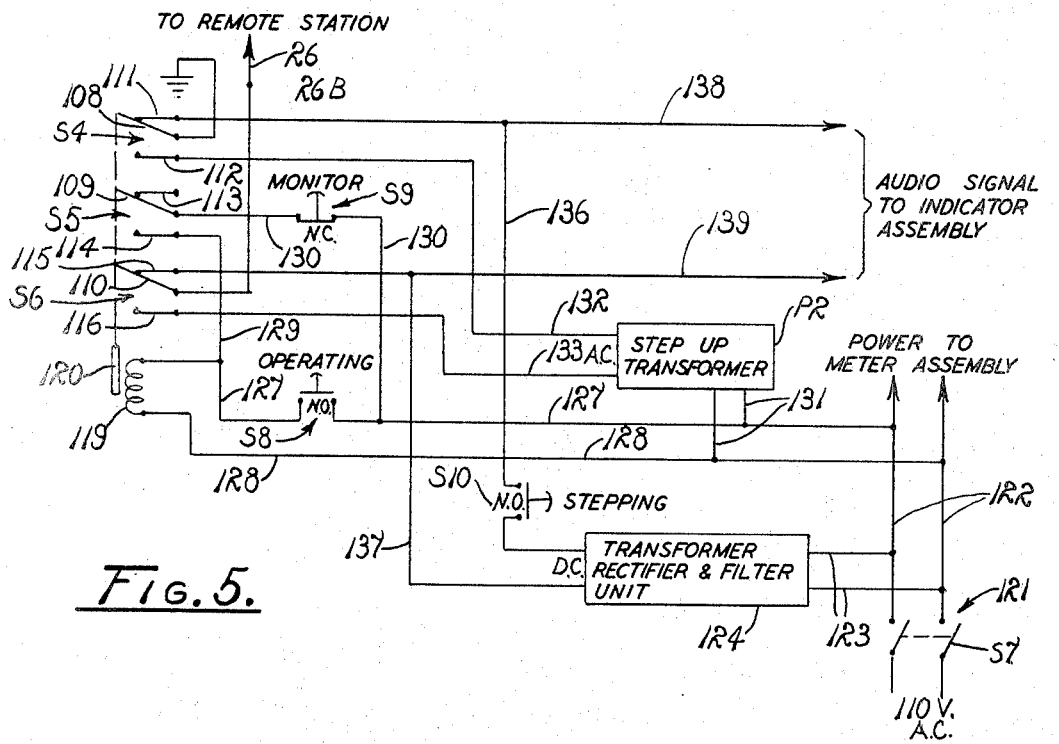
FIG. 5 is a schematic circuit diagram of a monitor switch, operating switch, and stepping switch relay system at the control station of the present invention.

A feature of this invention is the single conductor element or wire 26 having both a remote-station end 26A and a control-station end 26B and which connects the remote or downhole station to the control station, as shown in FIGS. 1, 4 and 5. It is possible to provide a shield element, not shown, for the single control wire which can serve as a common ground return for the system as well as to provide the structural strength necessary for suspension of the photographing device in a borehole.

*Changeover and step-relay circuit*

The single wire 26 is connected to the downhole elements through a changeover and step-relay circuit, shown in FIG. 4. This circuit includes a normally open step-relay switch S1. The step-relay switch includes a switching element 28, a contact 29, a solenoid winding 30 and a reciprocal plunger 31 for closing the switch upon energization of the winding. The winding is connected across opposite leg junctions 33 of a typical diode bridge unit B1 having also leg junctions 34 and 35. A load resistor R1 is connected in parallel with the winding. Leg junction 34 of the bridge is connected through a conductor 37 to the primary winding 38 of a transformer unit P1, which winding in turn is connected to the downhole end 26A of the single conductor element 26.

The switching element 28 and contact 29 of the step-relay switch S1 are connected through suitable conductors 39 and 40 to a stepping circuit, as shown in FIG. 8, for positioning the switching elements 18 of the stepper unit 17. Conductor 39 is conveniently connected to the positive terminal of a battery 43 having its negative terminal connected to ground, although it is possible to reverse the polarity in this circuit as well as in the remainder of the system. The battery has any suitable operating potential sufficient to energize the system elements in accordance with the principles of the present invention. Conductor 40 is connected to solenoid winding 20. The winding is in turn connected to ground.

The secondary winding 44 of the transformer unit P1 is connected to opposite leg junctions 45 of a typical semiconductor full-wave rectifier device or diode bridge rectifier B2, having also leg junctions 46 and 47. Conductor 50 connects leg junction 46 of the bridge to the winding 51 of an activation relay switch S2 having a normally open switching element 52 and contact 53, FIG. 4. The relay switch has a plunger 54 for closing the switching element in response to energization of the winding. The opposite end of the winding is connected in a manner described below. The activation relay switch may include an additional switching element, not shown, which is connected through conductor 57 to the flash circuit 13, FIG. 1, for actuating the flash circuit as described in the above patents related to a camera control apparatus.

The changeover and step-relay circuit also includes a changeover relay unit S3 having switching elements 58 and 59, and contacts 60, 61, 62 and 63, respectively. Normal positions of the switching elements are as shown in FIG. 4. The switching element 59 is connected to ground by means of conductor 66. Leg junction 47 of bridge B2 is connected to conductor 66. Leg junction 35 of the bridge B1 is connected by a conductor 67 to contact 62 of the relay switch, contact 63 being connected to conductor 37 by means of a conductor 68. Two bypass capacitors C1 are connected back to back between conductor 67 and conductor 37. A conductor 69 connects leg junction 46 to the positive terminal of the battery 43. A suitable diode D1 is connected to the conductor element 69 in a typical manner for blocking any current discharging from the battery into the changeover circuit.

The changeover relay unit S3 has a typical winding 70 and a reciprocal plunger 73 for actuating the switching elements upon energization of the winding. The winding is connected across opposite leg junctions 74 of a semiconductor full-wave rectifier device or a typical diode bridge rectifier B3 having also leg junctions 75 and 76. Leg junction 75 of the bridge is connected to conductor 66. Leg junction 76 is connected by a conductor 77 to the switching element 58.

A conductor element 80 having a current-limiting resistor R2 connects contact 61 of the relay switch 53 to conductor 50. A conductor element 81 connects a coupling capacitor C13 between the contact 60 and conductor 26.

The activation-relay winding 51 is connected by a suitable conductor 82 to an interlock deck 83, which is wired in any suitable manner, as exemplified schematically in FIG. 2, in order to shunt a current through the stepper 17 and into ground. The switching element 52 of the activation relay switch S2 is connected to ground through conductor 84. The contact 53 is connected through conductor element 87 to the respective decks for activation of a selected function member when the stepper switching elements connect the corresponding contact pairs and the activation relay switch is closed, as shown in FIG. 9, in response to energization of the winding 51. When in this position the switching element 18 closes a grounded circuit which includes in series the selected function member and the battery 43, as shown in FIG. 9.

*Function signaling stage*

A function signaling stage is shown in FIG. 7. This stage comprises a unit for providing an alternating current, preferably a symmetrical, astable multivibrator unit 88, the frequency of which current is determined by the position of the stepper switching element 18. The output of the multivibrator is fed into an audio power amplifier, preferably a push-pull transformer coupling 89 including two transformers, not fully shown, one having primary winding 90 and the other having secondary winding 91, respectively. Such a coupling is well known in the art and is shown only schematically. The multivibrator unit is also well known but is shown in greater detail in order to describe its connective relation with the stepper 17.

One of the stepper decks comprises an indicator deck 94, FIG. 2, and is wired so as to connect a separate distinctive resistor to each of the deck terminals 24, each resistor from R3 through R7, FIG. 7, corresponding to a particular function member and being automatically connected in the signaling circuit by conductor 95, which serves as a power line, upon connection of the corresponding function member as described above. An additional resistor R8 is connected in parallel with the multivibrator unit by conductor 96. The signaling stage is connected by conductor 97 to a signaling-power deck 98, which in turn is connected to the positive terminal of the battery 43. Conductor element 96 includes a resistor R9. The wiring of the signaling-power deck is suitably arranged to provide a continuous circuit through the deck to the battery, as exemplified schematically in FIG. 2, so that power may be supplied to the multivibrator and the transformer coupling, as shown in FIG. 7.

The multivibrator unit 88 itself consists of a pair of transistors T1 and T2 each having a conventional emitter, collector and base. A pair of resistors R10 and R11 are connected between conductor 95 and the respective collectors of T1 and T2. A pair of capacitors C2 and C3 are connected in a typical feedback arrangement between the collectors and bases of the respective transistors T1 and T2. A pair of resistors R12 and R13 are connected in parallel by conductor 101 between the respective bases and a wiper contact 24A on the indicator deck 94.

The emitters of T1 and T2 are connected to a grounded common current line 102 which also is connected in a suitable manner to the primary winding 90 of the push-pull transformer coupling 89. A variable resistor R14 having a slider 103 is connected in parallel with resistor R11 to allow presetting the circuit to obtain a desired audio level. The slider is connected in a suitable manner through a coupling capacitor C4 to the push-pull transformer coupling. A Zener diode D2 is connected by conductors between the common current line and the power line 95. The resistor R9 cooperates with the Zener diode to provide automatic voltage regulation in a well-known manner. A resistor R15 is connected between the common current line and conductor 101. Resistor R15 acts as a voltage divider in cooperation with resistors R3 through R8 to determine the frequency of the multivibrator output.

One signal conductor 104 leads from the push-pull transformer coupling 89 through a D.C. blocking capacitor C5 and is connected to conductor 81. A second signal conductor 105 leads from the push-pull transformer coupling and is connected to conductor 67 to provide a common line for grounding through the changeover relay S3 and conductor 66.

*Control station switching*

A control relay unit is provided at the control station and comprises three relay switches S4, S5 and S6, having switching elements 108, 109, 110, and contacts 111, 112, 113, 114, 115 and 116, respectively. The relay unit includes an electromagnetic device, such as a solenoid winding 119 with plunger 120, for selective positioning of the switching elements upon energization of the winding. Normal positions for the switching elements when not in operation are as shown in FIG. 5.

A source of energy, power or alternating current 121 is connectable to the system by means of a suitable main power switch S7. Conductor elements 122 are connected to the power source for power take-off as necessary. Suitable fuses, not shown, may be provided for greater safety of operation. A pair of conductors 123 lead from the conductor elements 122 to a suitable transformer, rectifier and filter unit 124 adapted to convert alternating current to direct current. Suitable current and voltage meters, not shown, may be provided with the unit 124 to indicate its output.

The switching element 110 of relay switch S6 is connected to the control-station end 26B of the conductor element 26. The switching element 108 of relay switch S4 is connected to ground.

A pair of conducors 127 and 128 connect the conductor elements 122 to the respective opposite ends of the solenoid winding 119 for energizing the same. A normally open operating switch S8 is provided in conductor 127. A conductor 129 connects conductor 127 to contact 114 of relay switch S5.

Conductors 130 connect a normally closed monitor switch S9 between conductor 127 and switch element 109 of relay switch S5.

A suitable step-up A.C. transformer is connected by conductors 131 to conductors 127 and 128, respectively. Two conductors 132 and 133 are connected to its A.C. output side. Conductor 133 is a hot line in the present embodiment and leads to contact 116 of relay switch S6, while conductor 132 is a common line and leads to contact 112. The step-up transformer is adapted to supply A.C. voltage from the main power supply 121 to the remote station as necessary.

A pair of conductors 136 and 137 lead from the D.C. side of the transformer, rectifier and filter unit 124. Conductor 136 leads through a normally open stepping switch S10 to contact 111 of relay switch S4. Conductor 137 leads to contact 115 of relay switch S6.

*Signal-receiving and metering assembly*

Figure 6:
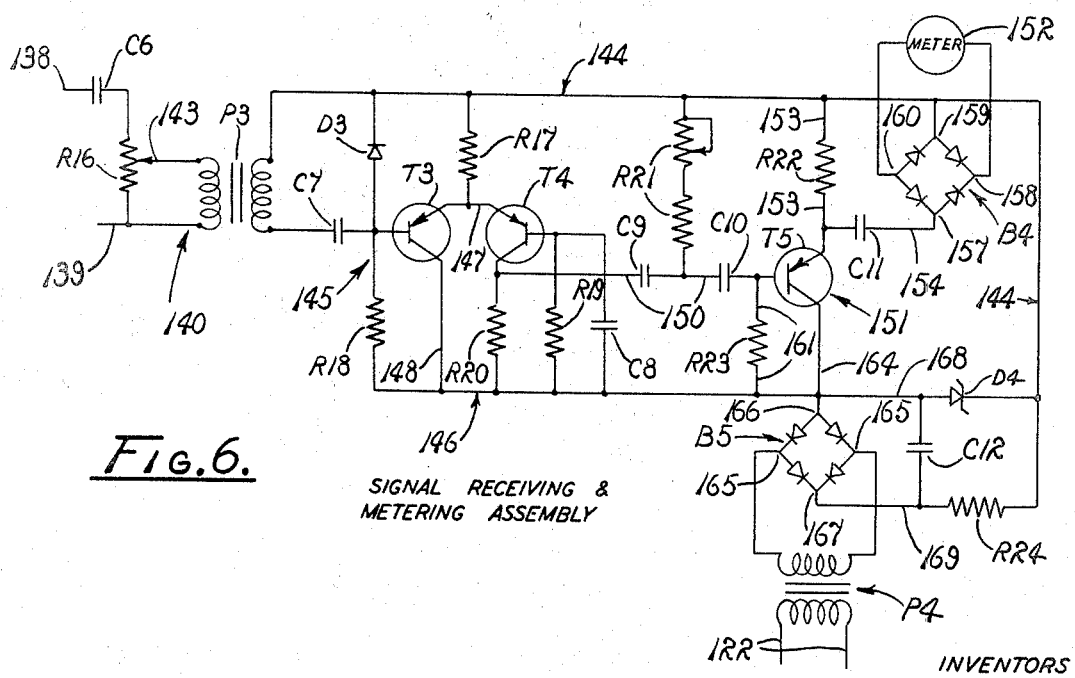
FIG. 6 is a schematic circuit diagram of the signal-receiving and metering assembly at the control station.

Conductors 138 and 139 are connected to conductors 136 and 137 respectively and lead through a suitable coupling unit 140 to a signal-receiving and metering assembly, as shown in FIG. 6. The coupling unit is adapted to allow sensitivity control, using well-known techniques, and consists preferably of a direct-current blocking capacitor C6 connected to a variable resistor R16, the slider 143 of which is connected to the primary of an impedance-matching transformer P3.

The secondary winding of the impedance-matching transformer P3 is connected at one end to a common positive line 144 and at the other end through a typical emitter-coupled limiter stage 145 to a common negative line 146. The limiter stage may be combined in the circuit using any suitable technique; however, in the present embodiment it is preferred to use emitter-coupled transistors T3 and T4 each having a typical emitter, collector and base. A capacitor C7 is connected to the other end of the secondary and couples the transformer to the base of transistor T3. A typical limiter diode D3 is connected in parallel with the secondary winding of P3 as shown in FIG. 6. A conductor 147 connects the emitters of the transistors and is in turn connected through a resistor R17 to the common positive line. High-resistance resistors R18 and R19 are connected respectively in a suitable manner between the respective bases of the transistors and the common negative line 146 for supplying an appropriate bias to the bases. An additional resistor R20 is connected between the collector of transistor T4 and the common negative line 146. A conductor 148 connects the collector of transistor T3 to the negative line. A by-pass capacitor C8 is connected between the base of transistor T4 and the negative line in order to hold the voltage at a constant level on the base.

A conductor 150 connects the collector of transistor T4 to an adjustable R-C high-pass filter consisting of capacitor C9 and a variable resistor element R21. Thence, conductor 150 leads through coupling capacitor C10 to an emitter follower stage 151. The capacitors and resistor element cooperate to determine the time constant for the circuit in accordance with well-known circuitry theory.

The emitter follower stage is of a typical design suitable for matching the impedance of the signal receiving circuit to a meter 152, to be described. The emitter follower stage includes a transistor T5 having a typical base, emitter and collector. Capacitors C9 and C10 are connected in series to the base. Conductor 153 connects the emitter through a resistor R22 to the common positive line 144. A conductor 154 connects the emitter through a capacitor C11 to a leg junction 157 of a semi-conductor full-wave rectifier device preferably a typical diode bridge rectifier B4 having also leg junctions 158, 159 and 160. Leg junction 159 is connected to the common positive line 144 and leg junctions 158 and 168 are connected respectively to the terminals of a typical function indicator or meter 152. A conductor 161 connects the base of the transistor T5 through resistor R23 to the common negative line 146. Conductor 164 connects the collector of the transistor to the negative line.

Power is supplied to the transistors T3, T4 and T5 of the receiving and metering assembly through a suitable step-down transformer P4 having its primary connected in the main power supply line 122.

The secondary of transformer P4 is connected to opposite leg junctions 165 of a semiconductor full-wave rectifier device, preferably a typical diode bridge rectifier B5, having also leg junctions 166 and 167. A filter capacitor C12 is connected across leg junctions 166 and 167 of the bridge by means of conductors 168 and 169. A Zener diode D4 is connected between conductor 168 and the common positive line 144. A resistor R24 is connected between conductor 169 and the positive line. The Zener diode and resistor R24 cooperate in a typical manner to provide automatic voltage regulation in the circuit.

OPERATION

The operation of the described embodiment of the subject invention is believed readily apparent and is briefly summarized at this point. Initially, the stepper switching elements 18 are in position I, as exemplified in FIG. 2. The main power switch S7 is first closed to complete the power circuit for the system.

*Stepping*

By closing the stepping switch S10 at the control station the control relay is energized by direct current from the transformer, rectifier and filter unit 124. The current proceeds through the single conductor element 26 to the remote station. The current is blocked from conductor 81 by the capacitor C13 but proceeds through the primary 38 of the transformer unit P1, which for this purpose acts as a choke. The current proceeds to the step-relay circuit to energize the relay winding 30 and to actuate the solenoid plunger 31 to close the switching element 28 and complete the stepping circuit shown in FIG. 8. As a result, the battery 43 energizes the stepping circuit and sends the necessary current through the stepper solenoid winding 20 to move the switching elements 18 and connect the contacts 24 in position II, as shown in FIG. 3.

Upon releasing the stepping switch S10 at the control station, it resumes its normally open position and the direct current ceases. As a result, the step-relay switch S1 opens and the stepper 17 and stepper solenoid winding 20 are ready for the next sequential step.

By successive manipulation of the stepping switch S10 at the control station, the stepper 17 may be conveniently actuated to position each of the switching elements 18 for successive activation of the function members, or for other related purposes as necessary. One deck of the stepper, a reset deck 172, is conveniently wired, as shown schematically in FIG. 2, so as to cooperate with the built-in interrupter, not shown, to effect the return of the decks 21 to the initial starting position after completion of a functioning cycle.

For selected positions of the switching elements 18 the respective function members are connected for operation as required. For use with the borehole camera apparatus of the present environment the various positions prepare the downhole circuitry for sequential operation as follows:

(I) Disconnect the function members and function signaling stage from the downhole battery 43 for cessation of operations or for charging of the battery as necessary.

(II–VI) Connect selected function members and the signaling stage for activation. In order of activation the selected functions are as follows: activation of the packer-inflation pump and motor 10; activation of the fluid-injection pump and motor 11; activation of the film and flash mechanism for the camera; reverse activation of the injection motor and pump to replace the clear fluid with the borehole fluid; and reverse activation of the packer-inflation motor and pump to collapse the packers.

(VII) Disconnect the function members and connect the signaling stage for indication of battery voltage.

(VIII, etc.) Reset to position I.

Signaling and metering

In positions II through VII as summarized above, the function signaling stage is connected to the battery 43 through the signaling-power deck 98 and is consequently ready for operation. The respective function indicator resistors R3, R4, R5, R6 and R7, connected to the function indicator deck 94, successively determine the voltage at contact point 24A, which in turn determines the oscillation frequency of the multivibrator 88 output. As a result, the multivibrator unit generates a distinctive audio frequency for each position of the switching elements 18 and thus provides an indication of which function member is connected for operation.

The frequency signal is amplified by the push-pull transformer coupling 89 for transmission through the single conductor element 26 to the control station. The Zener diode D2 and resistor R9 serve to regulate the voltage at point 173 so as to maintain a constant voltage during connection of each of the function members for activation, i.e., in positions II through VI. In position VII, the indicator resistor R8 substantially bypasses the voltage regulation elements so as to allow the voltage to vary and to reflect the actual potential of the battery 43. As a result, an audio frequency is signaled to the control station, indicating connection of the stepper switching elements 18 in position VII and also giving indication of the battery voltage.

In the present embodiment, conductor 104 carries the audio signal through the D.C. blocking capacitor C5 and the coupling capacitor C13 to the single conductor element 26, through which it proceeds to the control station. The signal is returned through ground to the common line comprising conductors 66, 67 and 105. The signal next proceeds through the relay switch S6 to the transformer coupling 140 where it energizes the primary winding and causes a suitable audio signal in the secondary. The signal then proceeds through the emitter-coupled limiter stage 145 where it is limited to a suitable level for passage through the high-pass filter C9, R21. The strength of the output signal from the filter is inversely proportional to its frequency. The signal then proceeds to the emitter-follower stage 151 through coupling capacitor C10. Thence it proceeds typically through the emitter-follower stage 151 to the meter circuit. The emitter-follower stage functions typically as an impedance matching device for the meter 152. The A.C. signal is rectified in the bridge rectifier B4 and proceeds to the meter 152. Power is supplied to the transistors T3, T4 and T5 of the metering assembly through the step-down transformer P4 and rectifier B5 unit, which also functions in a typical manner.

Function member activation and battery charging

After a selected function member has been connected for activation by positioning the stepper switching elements 18 in the appropriate position as outlined above, it is then ready to be activated by closing the operating switch S8. By observing the function-indicator meter 152 one may determine which function member is about to be activated. Closing the operating switch completes a power circuit which sends alternating current through the solenoid winding 119 to energize same and actuate the solenoid plunger 120. This changes the positions of the switching elements in relay switches S4, S5 and S6, and completes the operating circuit connected to the step-up transformer unit P2. As is apparent in FIG. 5, a common A.C. line 132 leads from the transformer through the switching element 108 and proceeds to ground. The hot line 133 from the step-up transformer passes through the switching element 110 and proceeds through the single conductor element 26 to the remote station. This causes A.C. to be sent down the conductor in an amount depending upon its length.

Closing the operating switch S8 causes switching element 109 to complete a bypass through monitor switch S9, as is evident in FIG. 5. This bypass maintains the operating circuit closed after release of the operating switch S8. The operating circuit may be broken by opening the monitor switch, as desired.

Upon reaching the changeover stage, the A.C. passes through the coupling capacitor C13 into the changeover relay S3 where it proceeds through the switching elements 58 into the bridge rectifier B3. Thence, D.C. signal energizes the winding 70 of relay S3 instantaneously to change the position of the switching elements 58 and 59 so that the A.C. is allowed to pass through the primary 38, the conductors 37 and 68, the switching element 59, and conductor 66 into ground.

With the primary winding 38 of the transformer unit P1 grounded, A.C. passes through the primary and causes a current in the secondary 44 of an amount approximating the battery 43 voltage. This A.C. proceeds through the bridge rectifier B2, where it is changed to D.C., then through the conductor 80, the current-limiting resistor R2, the switching element 58, and the bridge rectifier B3 to maintain the solenoid winding 70 in an energized condition and thus hold the switching elements 58 and 59 in position. It should be noted that although the relay S3 is initially actuated by rectified alternating current from conductor 81, this current passes through the winding 70 for only a brief moment, whereas the subsequent rectified alternating current from conductor 80 thereafter maintains the winding in an energized position indefinitely.

With the secondary winding 44 of the transformer unit P1 energized as described above, subsequent operation depends upon the position of the switching elements 18. When the switching elements are in position I, the activation relay winding 51 receives no current, since no continuous circuit is provided. Resistor R1 serves as a load resistor in order to prevent any voltage or counter-electromotive force stored in the operating circuit in position I from energizing the stepping circuit prematurely. It should also be noted that when the stepper switching elements are in position I, the battery 43 is disconnected from the function members as well as from the signaling stage. However, the conductor 69 connects the D.C. supply to the positive terminal of the battery 43 for charging if necessary. The diode D1 serves typically to prevent battery discharge from passing into the changeover circuit.

If the battery potential is undesirably low, as indicated by the meter 152 when the stepper switching elements 18 are in position VII, the stepper 17 may be stepped to position I and and by closing the operating switch S8, direct current is supplied to the battery 43 for charging. By opening the minotor switch S9 that alternating current is discontinued and the changeover circuit deenergized to discontinue charging of the battery. At this point the switching elements may be again stepped to position VII, whereupon he function meter will indicate the condition of the battery potential and, if still below a desirable level, the operating switch may be again closed to continue charging the battery as described above.

If the stepper switching elements 18 are in one of positions II through VII, the activation relay winding 51 is grounded through the interlock deck 83 and, therefore, becomes energized. As a result, the relay switching element 52 is closed and the activating circuit is completed to allow activation of the corresponding function member as described above. Opening the monitor switch discontinues activation by deenergizing the changeover circuit and the activation delay. Thereupon, the audio signals from the signaling stage are allowed to proceed through conductor 81, the coupling capacitor C13, and the single conductor 26 to the control station, where they are indicated on the meter 152. Reclosing the operating switch S8 again causes an alternating current to proceed to the changeover circuit for reenergizing the activation relay and activating circuit. In positions II through VI it is possible to supplement the battery power from the changeover circuit, if necessary to activate the respective function members. This supplemental power is suppled through conductor 69.

By use of contemporary electronic and telemetering techniques, an effective system can readily be constructed embodying the principles of the present invention. It is possible to obtain effective operation of the system described in the present embodiment at lengths of the single conductor element 26 up to approximately fifty thousand (50,000) feet. By selection of appropriate circuit elements the system can be adapted to withstand the temperature extremes encountered at great depths in the earth. However, by selection of circuit elements according to their temperature sensitivity it is possible to include temperature indication in the signaling and indicating phase of the system.

From the foregoing description, it is readily apparent that a system has been provided which allows selective activation from a control station of a plurality of functions disposed at a remote station, the activation of the functions being in predetermined continuous sequence. The system gives indication at the control station of conditions at the remote station. Both activation and indication are controlled in response to signals transmissible through a single control element leading from the control station to the remote station. The system is adapted to be used with a plurality of function members of any desired type and is sufficiently rugged and reliable for operation in all natural extremes of subterranean conditions or the like.

Although the invention has been herein shown and decribed in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A system for continuous control from a control station of a plurality of function members disposed at a remote station comprising a first source of electrical energy disposed at the remote station; first relay means disposed at the remote station; first switching means disposed at the remote station; first circuit means disposed at the remote station for connecting said first switching means to a selected function member in response to selective operation of said first relay means; second relay means disposed at the remote station; second circuit means disposed at the remote station for connecting said first source of energy, second relay means and first switching means for selective operation and control of said selected function member in response to selective operation of said second relay means; second switching means disposed at the control station; a single conductor element connecting said second switching means with said first and second circuit means respectively; a second source of electrical energy disposed at the control station and providing alternating current; and third circuit means disposed at the control station connecting the second source of energy to the second switching means, the third circuit means including rectifier means for selectively supplying direct current in place of alternating current for selective individual operation of said first and second relay means respectively in response to selective operation of the second switching means.

2. The system of claim 1 wherein the function members are operated selectively individually in predetermined sequence and wherein is provided at the remote station signaling means connected to the first switching means, said signaling means being activated by current from the first source of energy in response to operation of said first switching means, said signaling means conditioning said current to effect a distinctive predetermined frequency for each selected function, and said signaling means being connected to the single conductor element to signal to the control station the function selected for immediate sequential operation.

3. A system for continuous variable control from a control station of a plurality of electrically operable function members disposed at a remote station comprising solenoid-actuatable stepper switch means disposed at the remote station and having a plurality of switching contacts and switching elements, said stepper switch means being actuatable to connect said switching elements across the contacts of respective selected contact pairs; conductive means connecting the respective function members individually across the contacts of selected contact pairs in series with contacts connectable by said switching elements; a first source of electrical energy disposed at the remote station; first relay switch means; first circuit means connecting the first source of energy, the stepper switch means and the first relay switch means for completion of a circuit including selected contacts of the stepper switch means and adapted to energize a selected function member by current from said first source of energy in response to connection of selected switching elements across selected contacts and operation of said first relay switch means; a first solenoid for actuating the first relay switch means; a second solenoid for actuating the stepper switch means; second relay switch means; second circuit means connecting the first source of energy, the second relay switch means and the second solenoid for actuation of said stepper switch means in response to said second relay switch means; a third solenoid for actuation of said second relay switch means; second and third respective sources of electrical energy disposed at the control station and providing direct and alternating current respectively; a single elongated conductor element having a first end disposed at the control station and a second end disposed at the remote station; third circuit means including selectively operable switch means connecting said first end to the second and third sources of energy for selectively supplying direct and alternating current thereto; fourth circuit means including said second relay switch means disposed at the remote station and connecting said second end to the second solenoid to provide a circuit for energizing said second solenoid and actuating the stepper switch means by supplying direct current energy from the second source in response to operation of the third-circuit switch means; and fifth circuit means including the second relay switch means disposed at the remote station and connecting said second end to the third solenoid to provide a circuit for energizing said third solenoid by supplying alternating current energy from the third source in response to operation of the third-circuit switch means, said stepper switch means being selectively actuated and said remote function members being selectively energized by selective operation at the control station of said third-circuit switch means.

4. A system for continuous control from a control station of a plurality of electrically operable function members disposed at a remote station comprising, at the remote station, solenoid-actuatable stepper switch means having a plurality of switching elements and a plurality of switch contacts for each switching element, said stepper switch means being actuatable to connect said switching elements respectively across the contacts of respective selected contact pairs; conductive means connecting the respective function members individually across the contacts of selected contact pairs in series with contacts connectable by said switching elements; a first ource of electrical energy, first relay switch means; first circuit means connecting the first source of energy, the stepper switch means and the first relay switch means for completion of a circuit including selected contacts of the stepper switch means and adapted to energize a selected function member by current from said first source of energy in response to connection of selected switching elements across selected contacts and operation of said first relay switch means; a first solenoid for actuating the first relay switch means; a second solenoid for actuating the stepper switch means; second relay switch means; second circuit means connecting the first source of energy, the second relay switch means and the second solenoid for actuation of said stepper switch means in response to actuation of the second relay switch means; a third solenoid for actuation of said second relay switch means; third circuit means including the first solenoid and adapted to supply direct current to said first solenoid; fourth circuit means including the third solenoid and adapted to accommodate direct current; an elongated single conductor element between the stations having a first end disposed at the remote station and a second end disposed at the control station, said first end being connected to the third and fourth circuit means respectively; a second source of electrical energy at the control station; fifth circuit means connecting said second source to the second end of the single conductor element and including first control switching means, said fifth circuit means being adapted to send direct current through said single conductor element in response to actuation of said first control switching means and in cooperation with said second source of energy; and sixth circuit means connecting said second source of energy to the second end of the conductor element and including second control switching means, said sixth circuit means being adapted to send alternating current through said element in cooperation with the second source of energy and in response to actuation of said second control switching means, said stepper switch means being selectively actuated by actuation at the control station of said first control switching means, said remote function members being selectively energized in predetermined sequence by actuation at the control station of said second control switching means.

5. The system of claim 4 wherein the function members are operated selectively individually in predetermined sequence and wherein is provided at the remote station signaling means connected to the stepper switch means, said signaling means being activated by current from the first source of energy in response to operation of said first control switching means, said signaling means conditioning said current to effect a distinctive predetermined frequency for each selected function member, said signaling means being connected to the single conductor element to signal to the control station the function selected for immediate sequential operation.

6. The system of claim 4 including seventh circuit means including signaling means connected to the stepper switch means and adapted to provide an alternating current having individually characteristic frequencies for the respective function members, said seventh circuit means being connected to the first end of the single conductor element to signal to the control station the function member selected for immediate sequential operation.

7. The system of claim 6 wherein the first source of energy has a potential, said system including conductive means connected to a selected contact pair separate from the first circuit means; and conductive means connecting said contact pair and the first source of energy to the signaling means, said stepper switch means being actuatable in response to operation of the first control switching means to connect a selected switching element across said separate contact pair so that current from the source of energy passes through said signaling means and single conductor element to signal to the control station the potential of said first source of energy.

8. The system of claim 6 wherein the first source of energy comprises a battery and the third circuit means includes third relay switch means actuated by a fourth solenoid; transformer means having a normally open primary circuit and a secondary circuit; full-wave rectifier means; conductive means connecting said third relay switch means to said third circuit means to receive alternating current from the single conductor element and to close said primary circuit thereby causing alternating current in the secondary circuit; conductive means connecting said rectifier means to said secondary circuit to receive and to change the alternating current therein to direct current; and conductive means including said third relay switch means connecting said rectifier means to the first circuit means and to the fourth solenoid to allow said direct current selectively to charge the battery, to supplement energization of the respective function members by said battery and to energize the fourth solenoid.

9. The system of claim 8 wherein the signaling means includes current oscillating means; signal amplifying means; means coupling said oscillating means to said amplifying means; and conductive means connecting the amplifying means to the first end of the single conductor element so as to block direct current from passing therethrough; and wherein is included eighth circuit means disposed at the control station and connected to the second end of the single conductor element, said eighth circuit means including frequency-sensitive indicator means adapted to distinguish the characteristic frequencies signaled from the signaling means, and means receiving the signaling current from the single conductor element and conditioning same for indication, said receiving and conditioning means being connected to the indicator means.

10. The system of claim 9 wherein the receiving and conditioning means comprises an emitter-coupled limiter stage including a pair of transistors and a limiter diode; means coupling said emitter-coupled limiter stage to the second end of the single conductor element and adapted to control the sensitivity of the receiving means to received signals, said coupling means including a transformer and a capacitor for isolating the coupling means from direct current; an emitter-follower stage for matching the impedance of the receiving and conditioning means with the indicator means and including a transistor; means coupling the emitter-coupled limiter stage with the emitter follower stage; and wherein is provided means coupling the second source of energy to the emitter coupled limiter stage and the emitter follower stage for supply of power to said transistors; and means connecting the emitter-follower stage to the indicator means, including full-wave rectifier means for providing a steady signal for each characteristic frequency.

11. A control system for borehole apparatus comprising a control station including first means having selectively operable means for selectively supplying alternating and direct current to a single conductor element connected at one end to said first means; and a remote station located in a borehole and including a plurality of electrically activatable function members, second means including bridge means, said second means being responsive to direct current for selecting a function member to be activated, third means including transformer means and rectifier means, said third means being responsive to alternating current for activating the selected function member; said single conductor element being connected at its other end to said second and third means for supplying direct and alternating current thereto respectively in response to selective operation of said selectively operable means.

12. The system of claim 11 wherein said transformer means and rectifier means are included in a changeover circuit having operable switch means, said changeover circuit being responsive to alternating current for operating said switch means and causing flow of the alternating current through the transformer means.

References Cited

UNITED STATES PATENTS

| | | | |
|---|---|---|---|
| 2,883,647 | 4/1959 | Leeds et al. | 340—163 |
| 2,924,813 | 2/1960 | Meador | 340—163 |
| 3,122,723 | 2/1964 | Coley et al. | 340—163 |

JOHN W. CALDWELL, *Primary Examiner.*

H. I. PITTS, *Assistant Examiner.*